US012766980B2

(12) United States Patent
Hunt et al.

(10) Patent No.: US 12,766,980 B2
(45) Date of Patent: Oct. 20, 2026

(54) MOUNTING SYSTEM FOR ON-BOARD GENERATOR

(71) Applicant: RV Mobile Power, LLC, Columbus, OH (US)

(72) Inventors: Jarvis Hunt, Middlebury, IN (US); Stephen H. Holt, Granger, IN (US)

( * ) Notice: Subject to any disclaimer, the term of this patent is extended or adjusted under 35 U.S.C. 154(b) by 2 days.

(21) Appl. No.: 18/914,865

(22) Filed: Oct. 14, 2024

(65) Prior Publication Data

US 2025/0178455 A1 Jun. 5, 2025

Related U.S. Application Data

(60) Provisional application No. 63/604,376, filed on Nov. 30, 2023.

(51) Int. Cl.
*B60L 50/10* (2019.01)

(52) U.S. Cl.
CPC .................................... *B60L 50/10* (2019.02)

(58) Field of Classification Search
None
See application file for complete search history.

(56) References Cited

U.S. PATENT DOCUMENTS

| | | | | | |
|---|---|---|---|---|---|
| 4,223,881 | A * | 9/1980 | Hickman | B25H 1/04 | 269/244 |
| 5,407,171 | A * | 4/1995 | Gonzalez | F24F 13/32 | 248/676 |
| 5,542,639 | A * | 8/1996 | Wixey | B23D 47/025 | 248/440 |
| 6,854,314 | B2 * | 2/2005 | Cleave | B23D 33/00 | 248/676 |
| 12,146,482 | B2 * | 11/2024 | Immel | F04B 39/023 | |
| 2006/0202400 | A1 * | 9/2006 | Fitzgerald | F16F 3/0876 | 267/293 |
| 2014/0048349 | A1 * | 2/2014 | Swist | F16F 15/08 | 181/207 |
| 2018/0251173 | A1 * | 9/2018 | Kirtland | B60K 5/12 | |

* cited by examiner

*Primary Examiner* — Steven M Marsh
(74) *Attorney, Agent, or Firm* — Suiter Swantz IP

(57) ABSTRACT

The embodiments herein provide a mounting system for an on-board generator that contains a pair of horizontal cradle members which connect to a pair of vertical cradle members. A top cradle member is then attached to the vertical cradle members to where the top cradle member preferably provides a flat mounting surface for mounting bolts. The top cradle member contains tabs on the inner side of the top cradle member and an outer rib on the outer side of the top cradle member. Preferably, a vibration isolator is also used to connect the top cradle member to the side cradle member.

17 Claims, 8 Drawing Sheets

MOUNTING SYSTEM FOR ON-BOARD GENERATOR

CROSS-REFERENCE TO RELATED APPLICATIONS

This application claims priority to U.S. Provisional Application No. 63/604,376 filed on Nov. 30, 2023 which is herein incorporated by reference in its entirety.

BACKGROUND

Generators provide power in off-grid applications and/or remote areas where the power grid cannot be easily accessed. Generators can be powered by gasoline, LP, hydrogen, or any other fuel commonly used to generate power. During the conversion of potential chemical energy to electricity, a combustion engine is typically used to burn the fuel and convert this to electrical energy. When operating, a combustion engine is known to create vibrations through the quick revolutions of the crankshaft of the engine and other components. Depending on the method for attaching the generator to the vehicle being used, these vibrations can be transferred from the generator to the vehicle to produce a number of undesirable results such as noise, unsettling vibrations for passengers/guests, and damage to vehicle components (both mechanical and electrical) from excessive vibrations.

BRIEF DESCRIPTION OF THE DRAWINGS

These drawings illustrate certain aspects of some of the embodiments of the present disclosure and should not be used to limit the disclosure.

DETAILED DESCRIPTION

Figure 1:
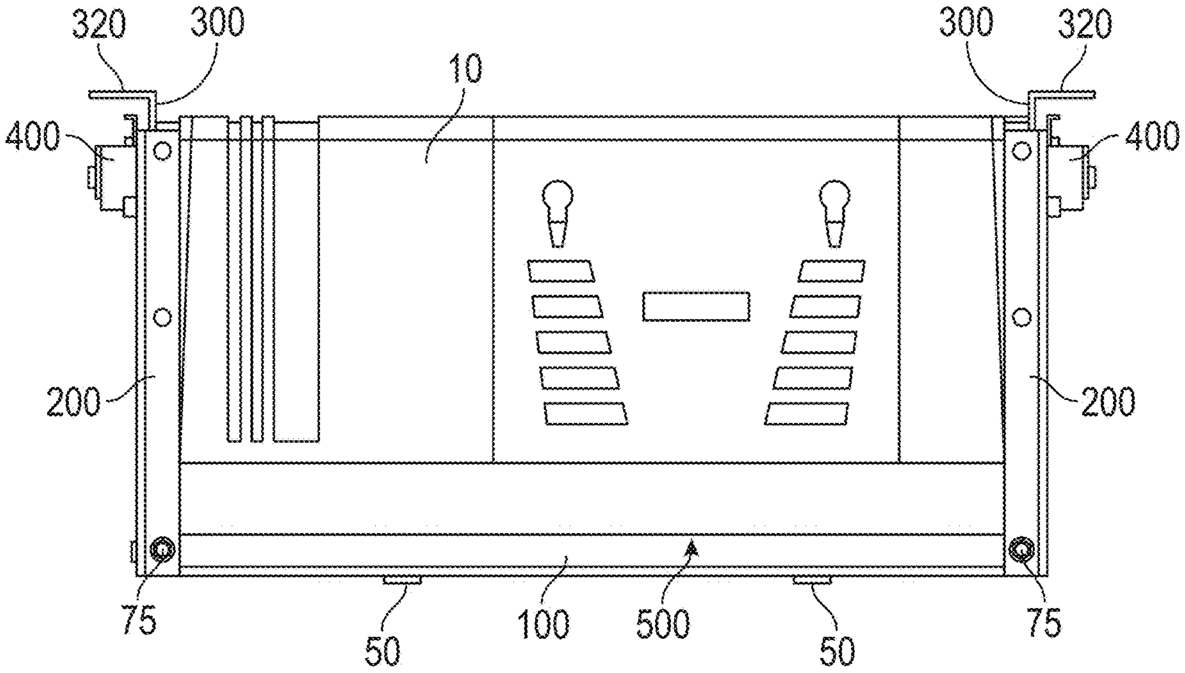
FIG. 1 is a front projection view of a generator attached to an exemplary mounting system.

Embodiments are described more fully hereinafter with reference to the accompanying drawings, in which various embodiments of the disclosure are shown. The disclosure may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments disclosed herein provide a mounting system for attaching a generator to a vehicle (motorized) or trailer (towable). An exemplary mounting system contains a pair of horizontal cradle members which bolt into the bottom of the generator, and a pair of vertical cradle members which attach to the horizontal cradle members. A top cradle member attaches to each vertical cradle member and provides a flat surface for mating with the mounting surface on the vehicle or trailer. One or more tabs extend downwardly on the inner side of top cradle member to provide apertures for mounting bolts while the outer side of the top cradle member contains an outer rib.

INDEX OF NUMERAL CALLOUTS

10 generator
50 generator bolt
75 cradle bolt
76 aperture
100 horizontal cradle member
150 generator bolt aperture
200 vertical cradle member
300 top cradle member
305 aperture
310 tab
320 mounting bolt aperture
330 top mounting plate
340 inside vertical plate
350 outer rib
375 bolt
380 nut
400 vibration isolator
405 aperture
410 bottom edge of inside vertical plate
420 bottom edge of outer rib
500 mounting system FIG. 1 is a front projection view of a generator 10 attached to an exemplary mounting system 500 which generally consists of two horizontal cradle members 100 which fasten to the generator using bolts 50, a pair of vertical cradle members 200 extending upwardly from the members 100, and a top cradle member attached at the top of each of the vertical cradle members 200. Bolts 75 may be used to secure the horizontal cradle members 100 to the vertical cradle members 200. Preferably, each horizontal cradle member 100 has a left end and a right end where both ends are attached to different vertical cradle members 200 using bolts 75.

The top cradle members 300 each include one or more apertures 320 to accept mounting bolts so that the mounting system 500 and generator 10 can be fastened to a stable surface on the a vehicle, generally so that the mounting system 500 and generator 10 can hang from a surface above (sometimes the floor of an RV, the bed of a work truck, or the roof of a storage/tool compartment). In a preferred embodiment, a vibration isolator 400 may be connected between the top cradle member 300 and the vertical cradle member 200, as described in further detail below.

Figure 2:
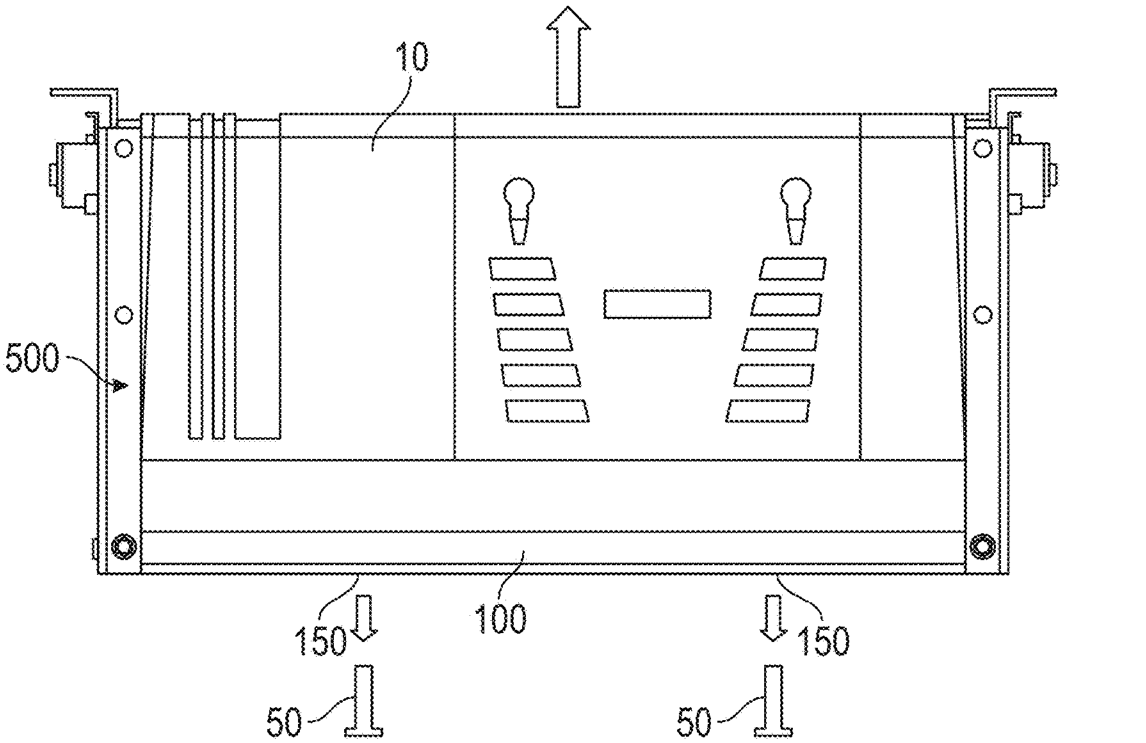
FIG. 2 is a front projection view of the embodiment from FIG. 1 where the generator bolts have been removed so that the generator can be lifted and removed from this embodiment of the mounting system.

FIG. 2 is a front projection view of the embodiment from FIG. 1 where the generator bolts 50 have been removed so that the generator 10 can be lifted and removed from this embodiment of the mounting system 500. Preferably, each generator bolt 50 passes through an aperture 150 on the horizontal cradle member 100 and threads into a female threaded hole on the bottom of the generator pan. This secures the generator 10 to the mounting system 400. Any number of bolts 50 may be used but preferably there are at least two (2) bolts 50 for each horizontal cradle member 100. Once all of the bolts 50 have been removed, the generator 10 can be lifted vertically away from the mounting system 400.

An alternative method for removing the generator 10 from the mounting system (after removing the bolts 50) would be to remove the bolts 75 which secure the horizontal cradle members 100 to the vertical cradle members 200 and separate the horizontal cradle members 100 from the vertical cradle members 200 which completely frees the generator 10 from the mounting system 400 allowing it to not only be lifted vertically but also slide horizontally now that the vertical cradle members 200 have been removed.

Another method for removing the generator 10 from the mounting system 400 would be to first remove bolts 75, in order to separate the vertical cradle members 200 and top cradle members 300 from the horizontal cradle members 100. Once members 200/300 are removed, the generator bolts 50 can be removed and the horizontal cradle members 100 separated from the generator 10.

Figure 3:
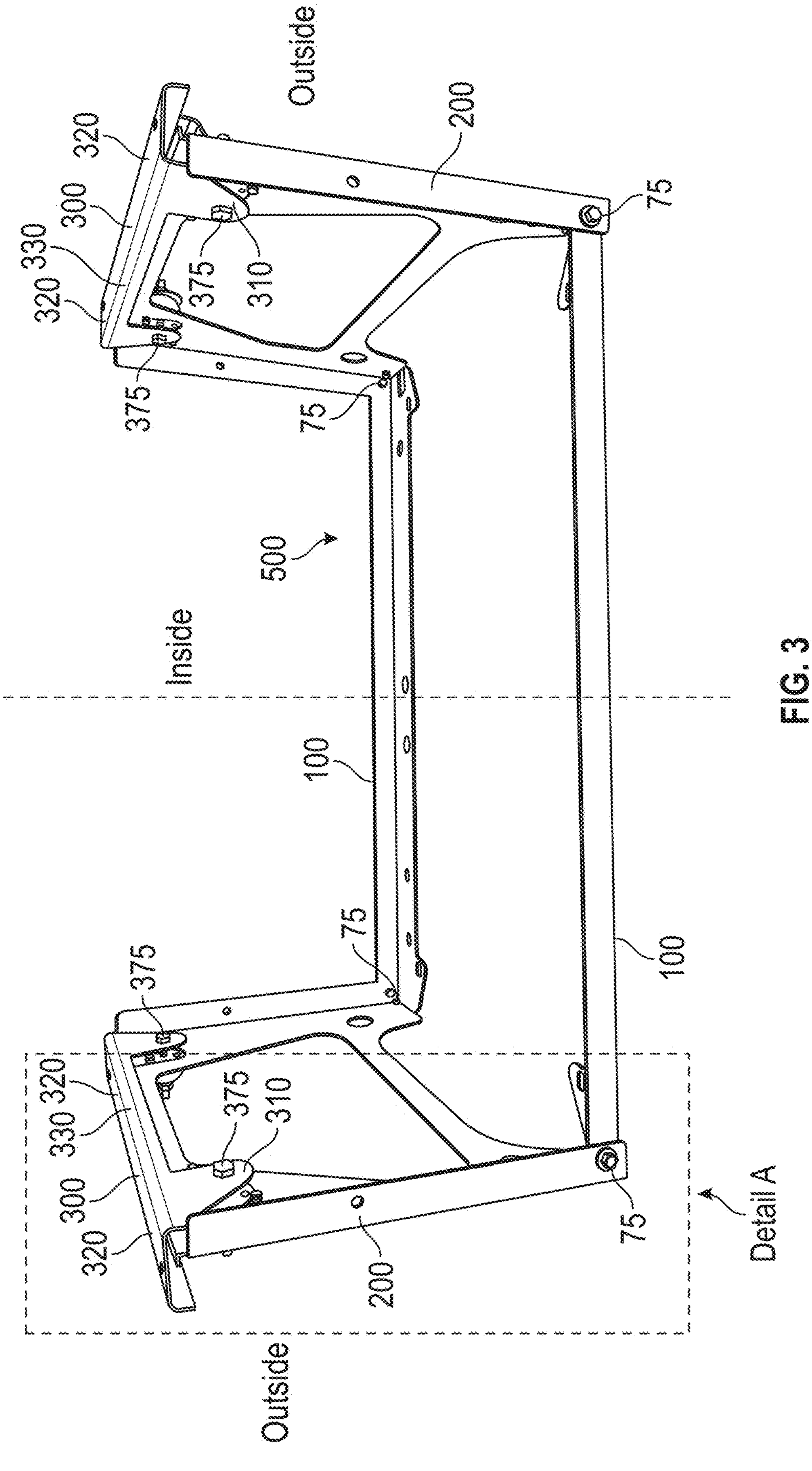
FIG. 3 is a front projection view of the embodiment from FIG. 1 where the generator has been removed from the mounting system and the location for Detail A is indicated.

FIG. 3 is a front projection view of the embodiment from FIG. 1 where the generator 10 has been removed from the mounting system 500 and the location for Detail A is indicated. As shown in the Figure, the portion inside the mounting system 500 that would contain the generator 10 is referred to herein as the 'inside' portion of the system. Similarly, the portions outside of the system 500 (i.e. on the left hand side and the right hand side of the system 500) are referred to herein as the 'outside' portion of the system. Various components may be described using the 'inside' and 'outside' orientation for clarity. In a preferred embodiment, the mounting system 500 is generally symmetrical about the vertical centerline shown in FIG. 3.

Using this orientation, note that each top cradle member 300 and vertical cradle member 200 has a side that faces the outside (i.e., the outer side) and a side that faces the inside (i.e., the inner side). Further note that each top cradle member 300 preferably contains at least one tab 310 that extends downwardly and is positioned on the inner side of each top cradle member 300.

Figure 4:
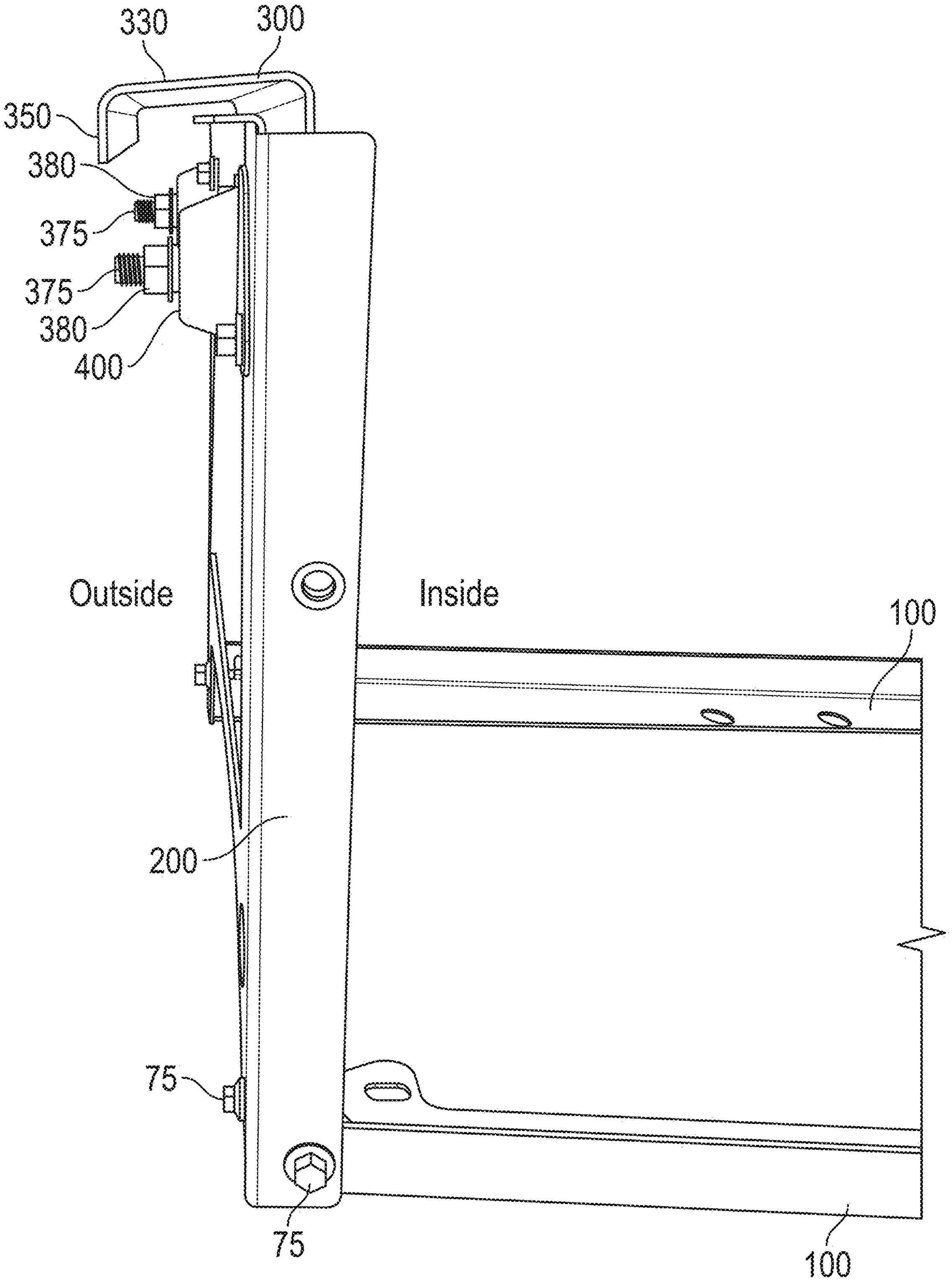
FIG. 4 is a detailed view of Detail A from FIG. 3.

FIG. 4 is a detailed view of Detail A from FIG. 3. In this embodiment, a pair of bolts 75 are used to secure each bottom corner of the mounting system 500 where the horizontal cradle members 100 attach to the vertical cradle members 200. Another bolt 375 is used to secure the vertical cradle members 200 to the top cradle members 300. This bolt 375 preferably passes through the vertical cradle member 200 and the top cradle member 300 and is secured in place with a nut 380 which is preferably positioned on the outer side of the cradle members 200 and 300. In a preferred embodiment, the bolt 375 also passes through a vibration isolator 400 which allows the vertical cradle member 200 to move relative to the top cradle member 300 which can dampen vibrations from the generator 10 from being transferred to the vehicle or surface on which the mounting system 500 hangs from.

The top cradle member 300 preferably contains a top mounting plate 330 that is generally flat, generally horizontal, and adapted to meet with the mounting surface on the vehicle or trailer once the mounting bolts are secured through the apertures 320. An outer rib 350 preferably extends downwardly from the top plate 330 on the outer side of the top cradle member 300. The outer rib 350 is preferably substantially vertical.

Figure 5:
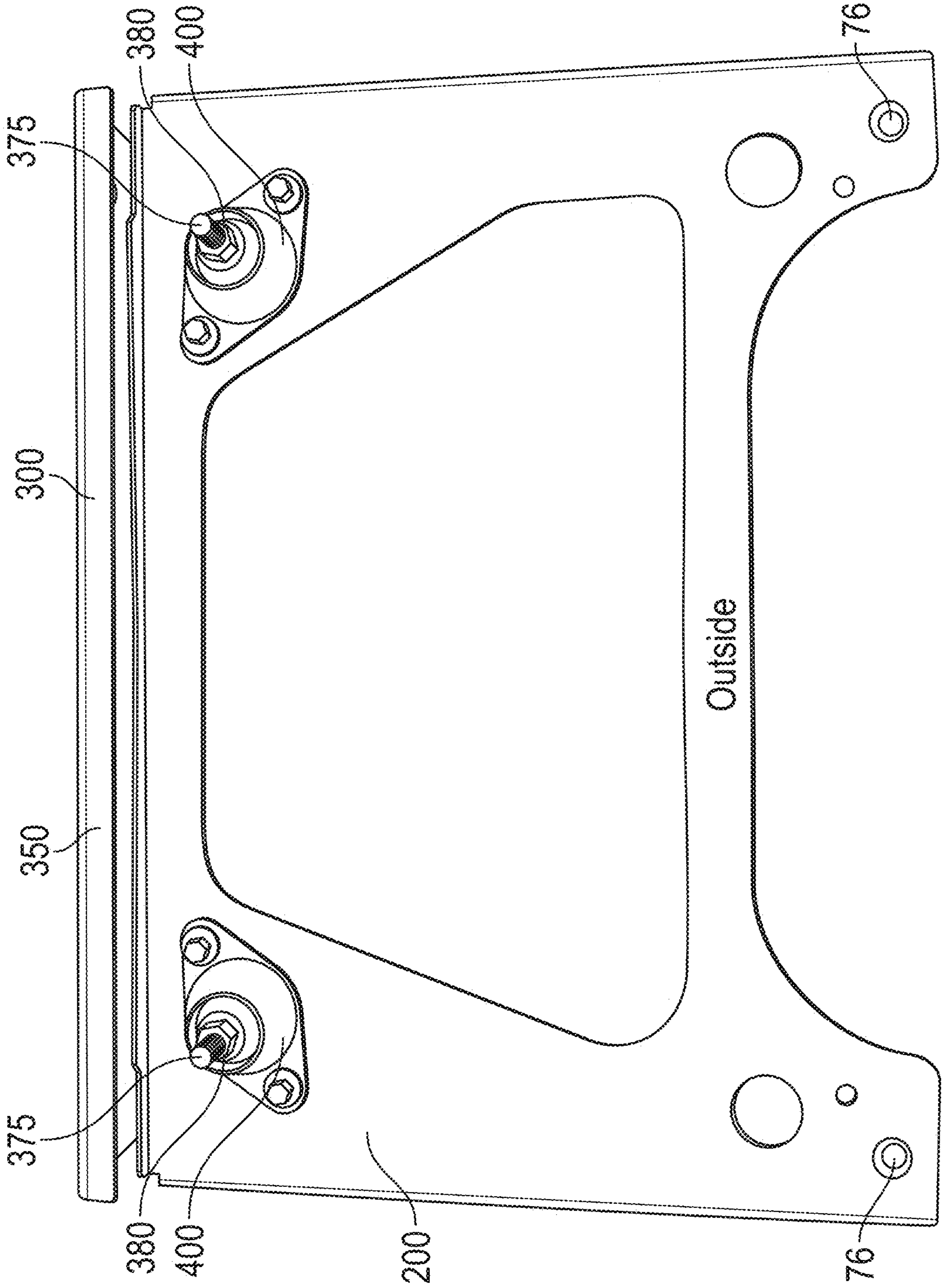
FIG. 5 is a side projection view of the outer side of a vertical cradle member while attached to a top cradle member.

FIG. 5 is a side projection view of the outer side of a vertical cradle member 200 while attached to a top cradle member 300. Here you can see the apertures 76 for accepting the bolts 75. Preferably, female threads are positioned behind each aperture 76 to accept the bolts and in an exemplary embodiment there would simply be welded nuts positioned behind the apertures 76 and accept each bolt 75.

Figure 6:
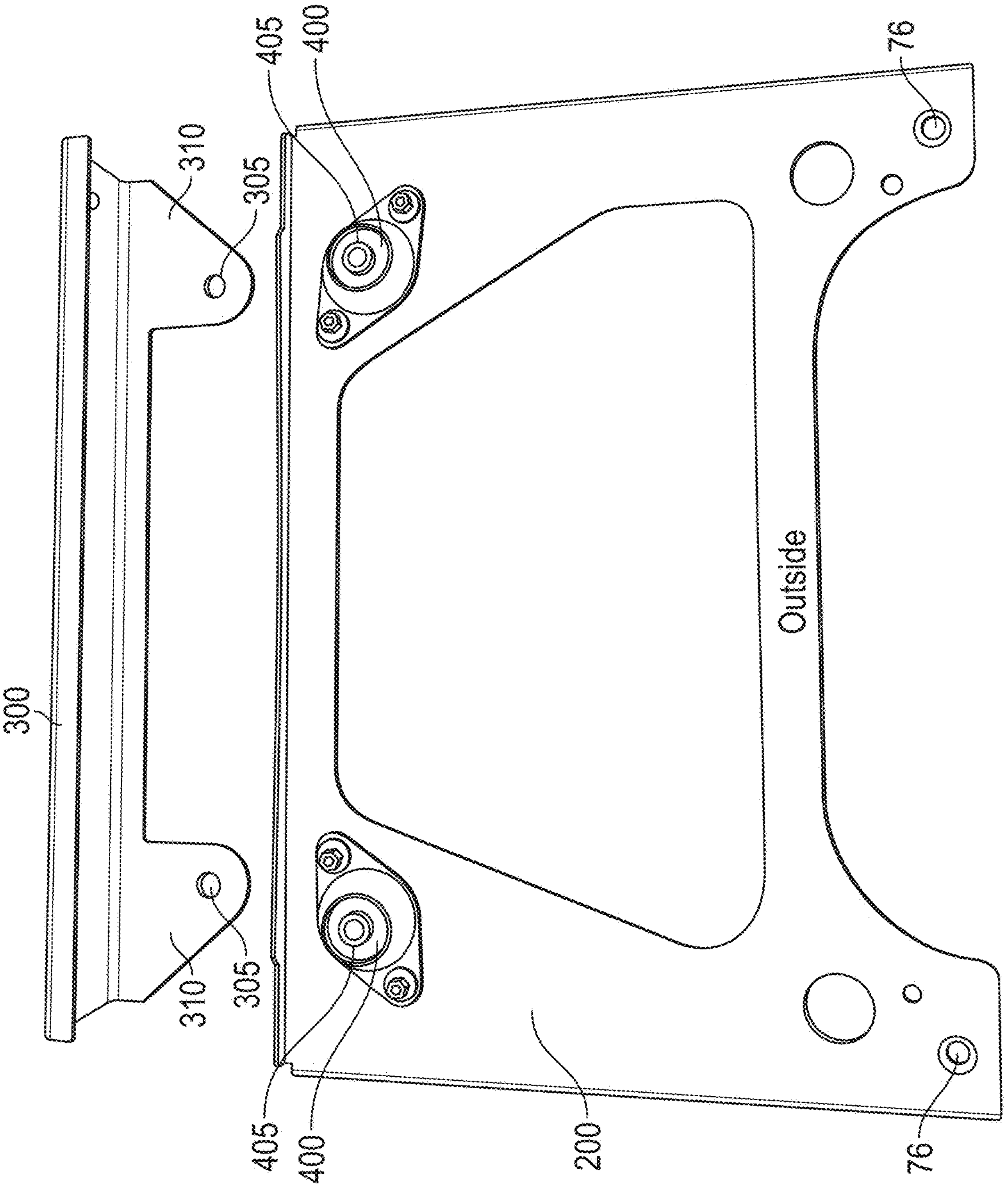
FIG. 6 is a side projection view of the embodiment shown in FIG. 5 where the top cradle member has been detached and separated from the vertical cradle member.

FIG. 6 is a side projection view of the embodiment shown in FIG. 5 where the top cradle member 300 has been detached and separated from the vertical cradle member 200. In order to disconnect these components, the nuts 380 are removed from the bolts 375, and the bolts 375 are then removed from the vibration isolator 400 and the top cradle member 300. In this figure, the apertures 305 are shown on the tabs 310 which extend downwardly from the top cradle member 300 and accept the bolts 375. Also shown are the apertures 405 in the vibration isolators 400 which also preferably accept the bolts 375.

Figure 7:
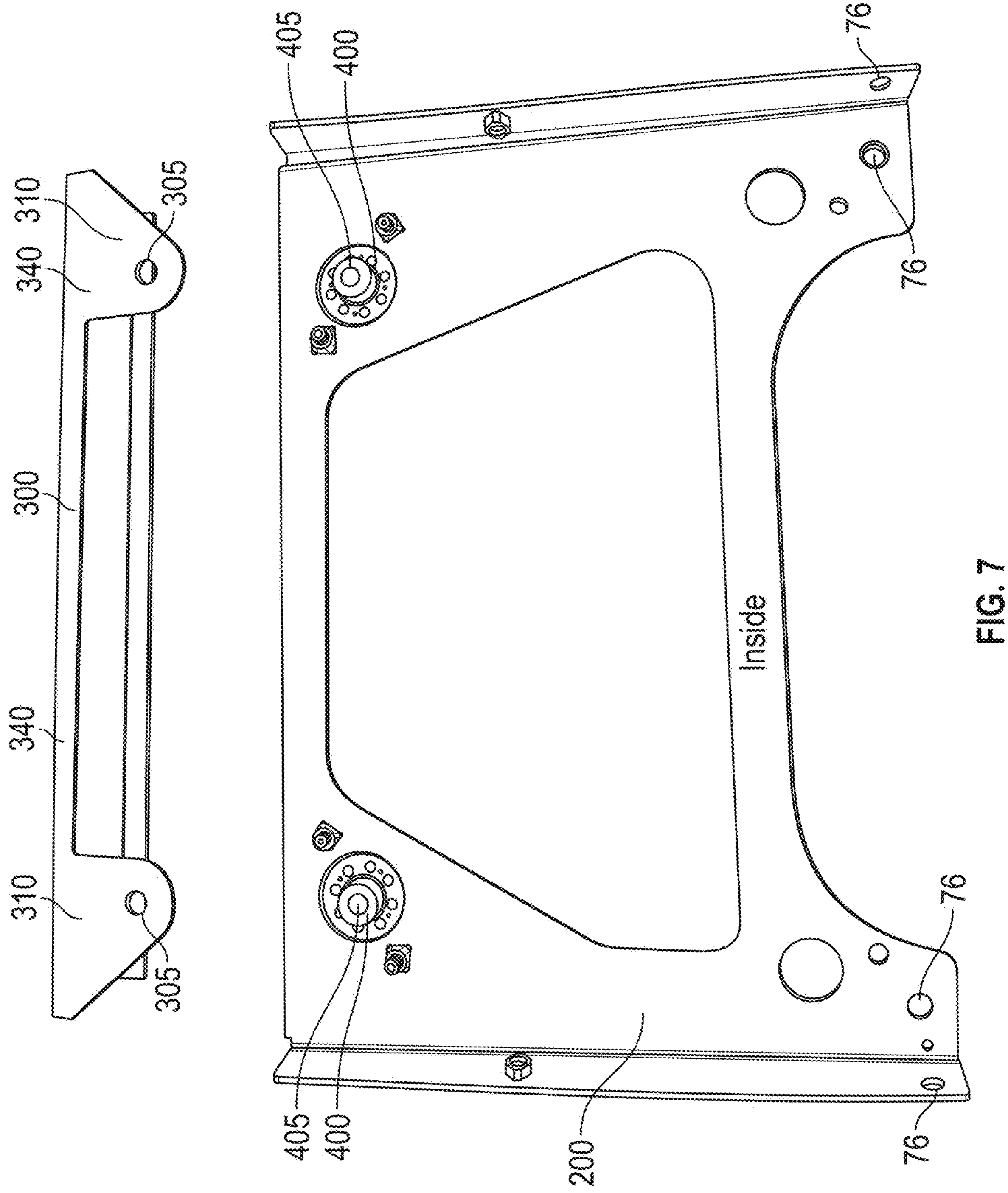
FIG. 7 is a side projection view of the inner side of the embodiment shown in FIG. 5 where the top cradle member has been detached and separated from the vertical cradle member.

FIG. 7 is a side projection view of the inner side of the embodiment shown in FIG. 5 where the top cradle member 300 has been detached and separated from the vertical cradle member 200. Note that the inside vertical plate 340 as well as the tabs 310 are each positioned on the inner side of the top cradle member 300. As shown, the inside vertical plate 340 preferably extends down the entire length (or substantially the entire length) of the top cradle member 300. The tabs 310 extend further downwardly from the inside vertical plate 340 and include the apertures 305.

Figure 8:
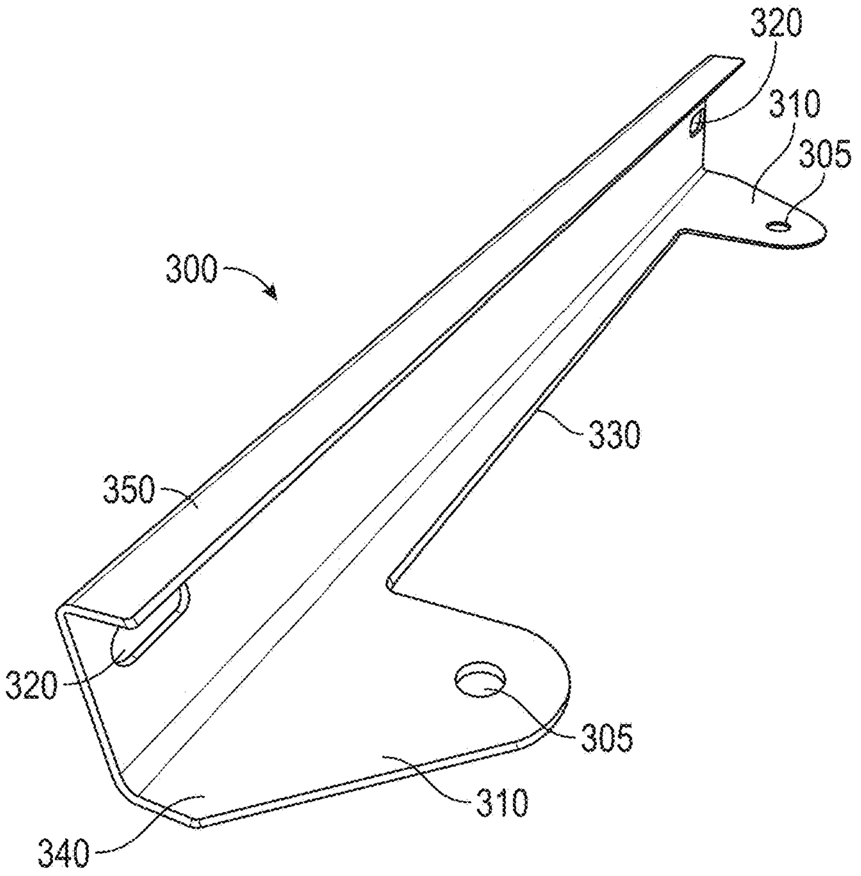
FIG. 8 is a perspective view of an exemplary top cradle member.

FIG. 8 is a perspective view of an exemplary top cradle member 300.

Figure 9:
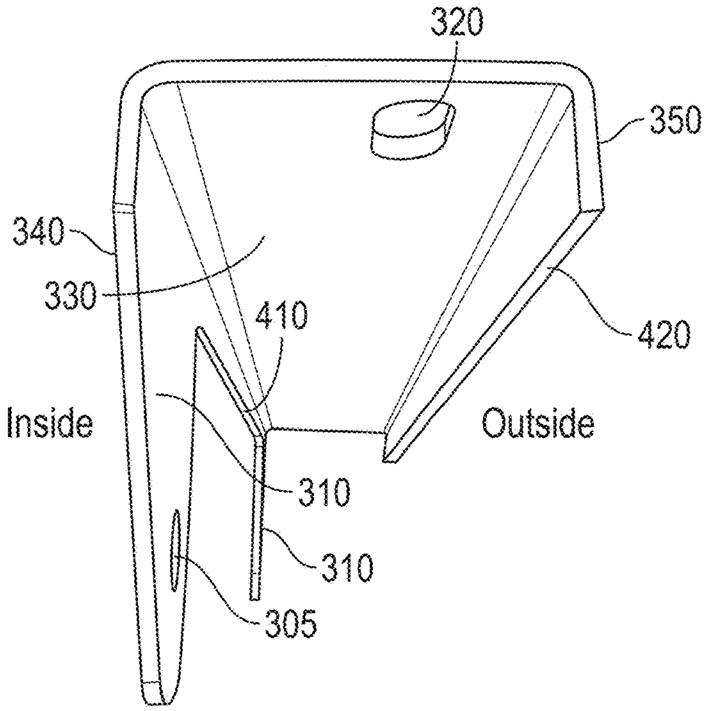
FIG. 9 is a front projection view of the embodiment shown in FIG. 8.

FIG. 9 is a front projection view of the embodiment shown in FIG. 8. As shown, an exemplary top cradle member 300 has a rectangular shape with a top mounting plate 330 that is substantially flat and would fit against the mounting surface on the vehicle or trailer. On the outer side of the member 300 the outer rib 350 preferably extends downwardly approximately to the bottom edge 410 of the inside vertical plate 340 (i.e., where the tabs 310 begin). Thus, the bottom edge 410 of the inside vertical plate 340 should be approximately parallel to the bottom edge 420 of the outer rib 350. Preferably, the tabs 310 are located below the bottom edge 420 of the outer rib 350 and the bottom edge 410 of the inside vertical plate 340.

Figure 10:
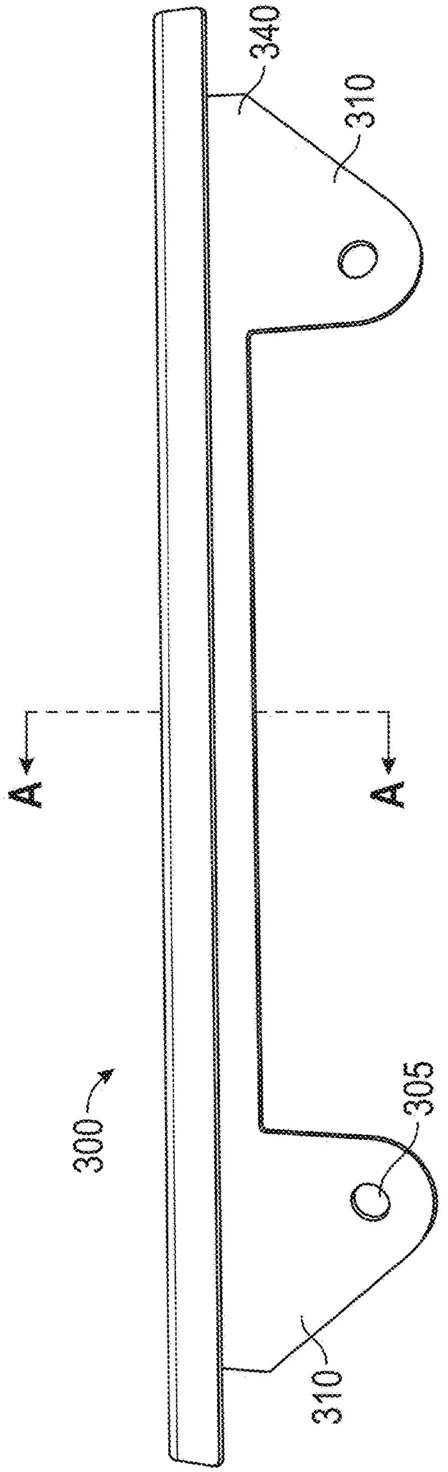
FIG. 10 is a side projection view of the outer side of the embodiment shown in FIG. 8 and indicating the location of section line A-A.

FIG. 10 is a side projection view of the outer side of the embodiment shown in FIG. 8 and indicating the location of section line A-A.

Figure 11:
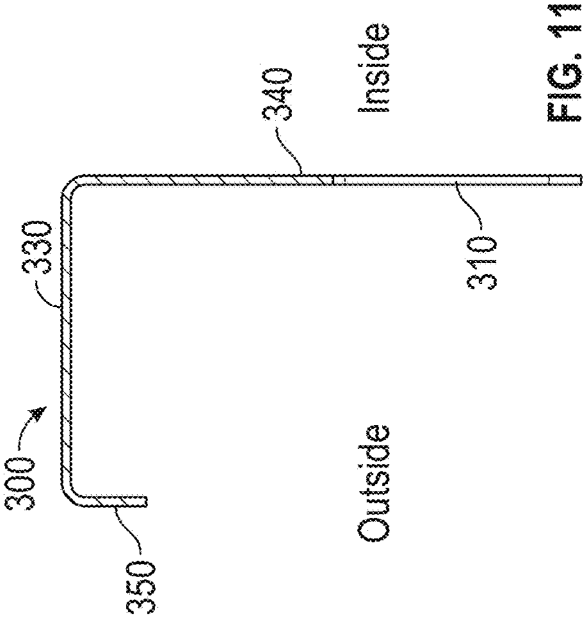
FIG. 11 is a section view taken along the section line A-A shown in FIG. 10.

FIG. 11 is a section view taken along the section line A-A shown in FIG. 10. Again, the inside plate 340 preferably extends downwardly from the top mounting plate 330 and is substantially vertical. In some positions on the top cradle member 330 where mounting bolts 375 are needed, the tabs 310 extend further downwardly from the inside plate 340 to provide the apertures 305.

It has been discovered that the embodiments of the mounting system described and shown herein provide significant and unexpected reduction in the vibrations transferred from the generator to the mounting system and eventually to the mounting surface of the vehicle or trailer.

It should be noted that while bolts are shown for connecting the cradle members, this could also be achieved by welding the pieces together and could achieve the same result. As used herein, the term 'bolt' means any rigid elongate member with a circular cross-section and does not necessarily require the use of any threads or nuts or fastener head.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

Having shown and described various embodiments of the disclosure, those skilled in the art will realize that many variations and modifications may be made to affect the disclosure and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A mounting system for an on-board generator comprising:

a pair of horizontal cradle members;

a pair of vertical cradle members which connect to the horizontal cradle members;

a top cradle member attached to each vertical cradle member and comprising:

a top mounting plate;

apertures within the top mounting plate for accepting mounting bolts;

one or more tabs on an inner side of the top cradle member;

an outer rib on an outer side of the top cradle member;

a vibration isolator positioned between the top cradle member and the vertical cradle member; and a bolt which passes through the vibration isolator and through each of the one or more tabs, wherein the outer rib does not extend down to the vibration isolator and does not engage with the bolt.

2. The mounting system of claim 1 wherein:

each tab extends downwardly away from the top mounting plate.

3. The mounting system of claim 1 wherein:

each bolt passes through both the top cradle member and a vertical cradle member.

4. The mounting system of claim 1 further comprising:

an aperture within each tab;

a bolt for each aperture within each tab, wherein one bolt passes through one of the apertures in addition to a vertical cradle member.

5. The mounting system of claim 1 wherein:

the one or more tabs are substantially vertical.

6. The mounting system of claim 1 wherein:

the outer rib is substantially vertical.

7. The mounting system of claim 1 wherein:

the one or more tabs are substantially parallel to the outer rib.

8. A mounting system for an on-board generator comprising:

a pair of horizontal cradle members;

a pair of vertical cradle members which connect to the horizontal cradle members;

a top cradle member attached to each vertical cradle member and comprising:

a top mounting plate;

apertures within the top mounting plate for accepting mounting bolts;

one or more tabs extending down and away from the top mounting plate;

a bolt which passes through each tab and the vertical cradle member;

an outer rib on an outer side of the top cradle member:

a vibration isolator positioned between the top cradle member and the vertical cradle member, wherein the bolt passes through the vibration isolator and through an aperture in each of the one or more tabs, and wherein the outer rib does not extend down to the vibration isolator and does not engage with the bolt.

9. The mounting system of claim 8 further comprising:

an inside vertical plate on an inner side of the top cradle member.

10. The mounting system of claim 8 further comprising:

an inside vertical plate connecting between the top mounting plate and the tab.

11. The mounting system of claim 10 further comprising:

a first bottom edge positioned on the inside vertical plate;

a second bottom edge positioned on the outer rib; and wherein the first bottom edge and second bottom edge are substantially horizontal.

12. The mounting system of claim 10 further comprising:

a first bottom edge positioned on the inside vertical plate;

a second bottom edge positioned on the outer rib; and wherein the first bottom edge and second bottom edge are substantially parallel.

13. The mounting system of claim 11 wherein:

each tab is positioned below the first bottom edge and the second bottom edge.

14. A mounting system for an on-board generator comprising:

a pair of horizontal cradle members sized to accept a generator;

a pair of vertical cradle members which connect to the horizontal cradle members;

a top cradle member attached to each vertical cradle member and comprising:

a top mounting plate providing a substantially flat surface;

apertures within the substantially flat surface for accepting mounting bolts;

one or more tabs extending down and away from the substantially flat surface;

a bolt which passes through each tab and the vertical cradle member; and an outer rib extending downwardly from the substantially flat surface of the top cradle member; and a vibration isolator positioned between the top cradle member and the vertical cradle member, wherein the bolt passes through the vibration isolator and through an aperture in each of the one or more tabs, and wherein the outer rib does not extend down to the vibration isolator does not engage with the bolt.

15. The mounting system of claim 14 wherein:

the one or more tabs are positioned on an inner side of each top cradle member while the outer rib is positioned on an outer side of each top cradle member.

16. The mounting system of claim 14 further comprising:

an inside vertical plate connecting between the top mounting plate and the tab.

17. The mounting system of claim 14 further comprising:

a first bottom edge positioned on the inside vertical plate;

a second bottom edge positioned on the outer rib; and wherein the first bottom edge and second bottom edge are substantially parallel; and wherein each tab is positioned below the first bottom edge and the second bottom edge.

* * * * *